US011576407B2

(12) United States Patent
Saurabh et al.

(10) Patent No.: US 11,576,407 B2
(45) Date of Patent: Feb. 14, 2023

(54) PRESERVATION OF MEAT PRODUCTS

(71) Applicant: Purac Biochem B.V., Gorinchem (NL)

(72) Inventors: Kumar Saurabh, Overland Park, KS (US); Eelco Anthonius Johannes Heintz, Gorinchem (NL); Geert Pieter Sijtsema, Gorinchem (NL); Johanna Plijter Schuddemat, Gorinchem (NL)

(73) Assignee: PURAC BIOCHEM B. V., Gorinchem (NL)

( * ) Notice: Subject to any disclaimer, the term of this patent is extended or adjusted under 35 U.S.C. 154(b) by 0 days.

(21) Appl. No.: 16/905,659

(22) Filed: Jun. 18, 2020

(65) Prior Publication Data

US 2020/0315221 A1 Oct. 8, 2020

Related U.S. Application Data

(62) Division of application No. 15/517,134, filed as application No. PCT/NL2015/050700 on Oct. 6, 2015, now abandoned.

(60) Provisional application No. 62/060,105, filed on Oct. 6, 2014.

(30) Foreign Application Priority Data

Oct. 6, 2014 (EP) .................................... 14187801

(51) Int. Cl.
*A23L 3/3472* (2006.01)
*A01N 47/44* (2006.01)
*A23B 4/20* (2006.01)
*A23L 3/3508* (2006.01)
*A23L 3/3526* (2006.01)

(52) U.S. Cl.
CPC ............ *A23L 3/3472* (2013.01); *A01N 47/44* (2013.01); *A23B 4/20* (2013.01); *A23L 3/3508* (2013.01); *A23L 3/3526* (2013.01); *A23V 2002/00* (2013.01)

(58) Field of Classification Search
CPC .... A23L 3/3472; A23L 3/3526; A23L 3/3508; A01N 47/44; A01N 31/08; A23B 4/20
See application file for complete search history.

(56) References Cited

U.S. PATENT DOCUMENTS

| 10,136,645 B2 * | 11/2018 | Daigle | A23B 4/20 |
| 2003/0108648 A1 * | 6/2003 | Ming | A23L 3/30 |
| | | | 426/532 |
| 2018/0007909 A1 * | 1/2018 | Daigle | A23B 4/20 |

FOREIGN PATENT DOCUMENTS

| CA | 2700633 A1 | 5/2003 |
| WO | WO-01/89308 A2 | 11/2001 |
| WO | WO-03/034842 A1 | 5/2003 |
| WO | WO-2007/014580 A1 | 2/2007 |
| WO | WO-2010/136405 A1 | 12/2010 |
| WO | WO-2012/055855 A1 | 5/2012 |

OTHER PUBLICATIONS

International Search Report and Written Opinion of the International Searching Authority for PCT/NL2015/050700 dated Feb. 12, 2016 (12 Pages).
Oladunjoye Ademola et al, "Synergistic activity between lauric arginate and carvacrol in reducing *Salmonella* in ground turkey," Poultry Science, vol. 92, No. 5, May 2013 (May 2013), pp. 1357-1365 (9 pages).
Yuhua Chang et al., "Fabrication, Stability and efficacy of dual-component antimicrobial nanoemulsions: Essential oil (thyme oil) and cationic surfactant (lauric arginate)," Food Chemistry, vol. 172, pp. 298-304 (2015).

* cited by examiner

*Primary Examiner* — Vera Stulii
(74) *Attorney, Agent, or Firm* — Foley & Lardner LLP

(57) ABSTRACT

The present invention relates to preservation of meat products. In particular new additives are provided for effective inhibition or prevention of bacterial outgrowth in meat products. The present inventors found that a combination of carvacrol and a cationic surfactant was effective in the inhibition or prevention of bacterial outgrowth in meat products. The combinations, more in particular, proved to be effective at levels that do not result in significant effects on the flavor and/or taste of the products. The present inventors furthermore found that treatment of meat products with the combinations of this invention had a favorable effect on the visual appearance (color) of the meat products. The present invention provides preservative compositions, the use of thereof as well as the meat products containing them.

18 Claims, 3 Drawing Sheets

PRESERVATION OF MEAT PRODUCTS

CROSS-REFERENCE TO RELATED APPLICATIONS

The present application is a divisional of U.S. patent application Ser. No. 15/517,134 filed Apr. 5, 2017, which is a continuation of International Application No. PCT/NL2015/050700 filed Oct. 6, 2015, which claims priority to European Patent Application No. 14187801.7 filed Oct. 6, 2014 and claims the benefit of U.S. Provisional Patent Application No. 62/060,105 filed Oct. 6, 2014, the entirety of these applications are herein incorporated by reference in their entirety.

FIELD OF THE INVENTION

The present invention relates to preservation of meat products. In particular new procedures and additives are provided for effective inhibition or prevention of bacterial outgrowth in meat products.

BACKGROUND OF THE INVENTION

Meat spoilage and rancidity is typically caused by unwanted growth of certain aerobic and anaerobic bacteria that contact the meat during processing. The opportunity for bacterial contact with the fresh meat begins when an animal is initially presented for processing and extends up until the time the meat product is consumed. The initial bacterial contact with fresh meat is encountered with a processing facility due to the contaminated state of the animal when it enters the facility. The time between the initial opportunity for bacterial contact with meat products and the ultimate consumption of such products by consumers, allows for the proliferation of various forms of bacteria, including the growth of undesired spoilage and pathogenic bacteria.

The growth of undesired bacteria on meat affects the shelf life thereof. For example, growth of spoilage bacteria, such as *Pseudomonades, Lactobacillus* and *Coliforms*, creates undesired odors and/or taste due to bacterial production of certain esters, hydrogen sulfide, nitrogenous compounds, propionic acid, formic acid, as well as other undesirable components. Some bacteria also act to discolor the surface of the meat. Moreover, when meat packaged in permeable plastic packages spoils, the packaging often inflates due to the generation of gas produced by spoilage bacteria.

Contamination of meat with pathogenic bacteria is also a great concern since such bacteria, or toxins produced by such bacteria, can cause illness or disease in humans and animals who consume such meat. In the meat processing industry, many types of bacteria are known to cause food poisoning including: *E. coli, Salmonella, Listeria, Staphylococcus, Streptococcus, Bacillus anthraces, Balantidium coli, Campylobacter coli, Campylobacter jejune, Francisella tularensis, Sarcocystis, Taenia saginata, Taenia solium, Toxoplasma gondil, Trichinella spiralis, Yersinia enterocolinea, Yersinia pseudotuberculosis, Brucella, Chlamydia petechia, Leptospira* and *Clostridium*. Each group of pathogenic bacteria proliferates under different conditions, any or all of which may be encountered in meat processing. For example, *Listeria* is generally found in cool, damp environments such as coolers and meat processing areas and is even able to proliferate in and compromise the safety of vacuum packaged meat.

In principle, measures to preserve meat resulting in elimination of bacteria or at least reducing outgrowth thereof, have been known (and practiced) for ages. Early preservation techniques of meat mainly took the form of drying, storing in salt (pickling), smoking, fermenting and/or (pre-)cooking. These processing methods, while effective for preserving the meat and preventing it from becoming spoiled or rancid, drastically change the overall visual and sensorial characteristics of the meat products.

In more modern times, freezing has become a common and effective way to retard the growth of bacteria that may be present on the surface of meat. However, by freezing a meat product, water within the meat crystallizes, causing the denaturing of proteins and other damage to the meat on a cellular level. The texture, consistency and taste of thawed frozen meat is less desirable than that of fresh meat. Consumers are accustomed to and often demand the sensorial quality (taste and texture) of non-preserved meat.

Keeping the meat under refrigeration temperatures only is much less detrimental to the quality of the meat and therefore still is the preferred option. The obvious down-side of keeping meat under refrigeration temperatures is that it is less effective in slowing down or preventing bacterial outgrowth. It has therefore often been attempted to apply additives or preservatives to further enhance the shelf-life of refrigerated meat products.

Well known additives for fresh meat include nitrates and nitrites, which not only help inactivate bacteria, but also give meat a pink or red color. Nitrate ($NO_3^-$), generally supplied by sodium nitrate or potassium nitrate, is used as a source for nitrite ($NO_2^-$). The use of nitrates in food preservation is controversial. This is due to the potential for the formation of nitrosamines when nitrates are present in high concentrations and the product is cooked at high temperatures.

Solutions of organic acids, such as lactic and acetic acids, are frequently used in commercial meat processing plants. Other organic acids, have been researched for use in chemical washes as well, including formic, propionic, citric, fumaric, and L-ascorbic acid. The mechanism of action of organic acids on the microbial cell is not completely understood, but it is hypothesized that it is the undissociated molecule of the acid that is responsible for the antimicrobial activity. Organic acids have been shown to be most effective when applied as a warm (50-55° C.) rinse. The USDA has specifically approved lactic acid, acetic acid, and citric acid as antimicrobial agents in the final wash that is applied to livestock carcasses after trimming and inspection but before chilling. There may be issues associated with the use of organic acids however in relation to meat surface discoloration. Furthermore, operators may experience skin/eye irritation when acetic acid is used. The use of acids, especially if applied at higher temperatures also enhances equipment corrosion.

Clearly, the consumers' demand for products with a 'fresh-like' quality is driving processors to develop new procedures and additives for effective inhibition or prevention of bacterial outgrowth. There is a particular desire to accomplish this using additives that the consumer perceives as 'natural'. Any ingredient used should not negatively interfere with the visual and/or sensorial properties of the products, i.e. when used at effective levels. It is the objective of the present invention to provide new additives conferring any or all of these advantages.

SUMMARY OF THE INVENTION

The present inventors surprisingly found that the objective of the present invention could be realized with a combination of carvacrol and a cationic surfactant, said cationic surfactant being a condensate of a fatty acid and an arginate ester. Such combinations are effective in preventing bacterial outgrowth in fresh/raw meat samples. The combinations, more in particular, proved to be effective at levels that do not result in significant effects on the flavor and/or taste of the products.

To the inventors knowledge there has never before been a disclosure of a composition comprising carvacrol and cationic surfactant as defined herein.

As will be illustrated in the appending examples, the present inventors, found that the application of preservative compositions comprising a combination of carvacrol and cationic surfactant as defined herein prevented bacterial growth in meat products, including fresh and raw meat products, under various conditions, such as under refrigeration (e.g. at around 4° C.), compared to untreated control samples and compared to control samples treated with acetic acid.

In certain embodiments the preservative combination that is the subject of this invention can be combined or used in conjunction with organic acids, such as acetic acid, lactic acid and/or propionic acid, which gives particularly good results, as can be inferred from the appending examples.

The present inventors furthermore found that treatment of meat products with the preservative combinations of this invention had a favourable effect on the visual appearance (in particular the color) of the meat products.

Hence, the present invention provides the preservative combinations, and the compositions containing them, that can be used to extend the shelf-life of meat products, in particular to reduce or prevent bacterial outgrowth and at the same time prevent or reduce discolouration. The use of these preservative combinations, the meat products containing them, and methods of treating meat products are also provided.

These and other aspects of the invention will be described and illustrated in more detail in the following sections.

DETAILED DESCRIPTION OF THE INVENTION

Figure 1:
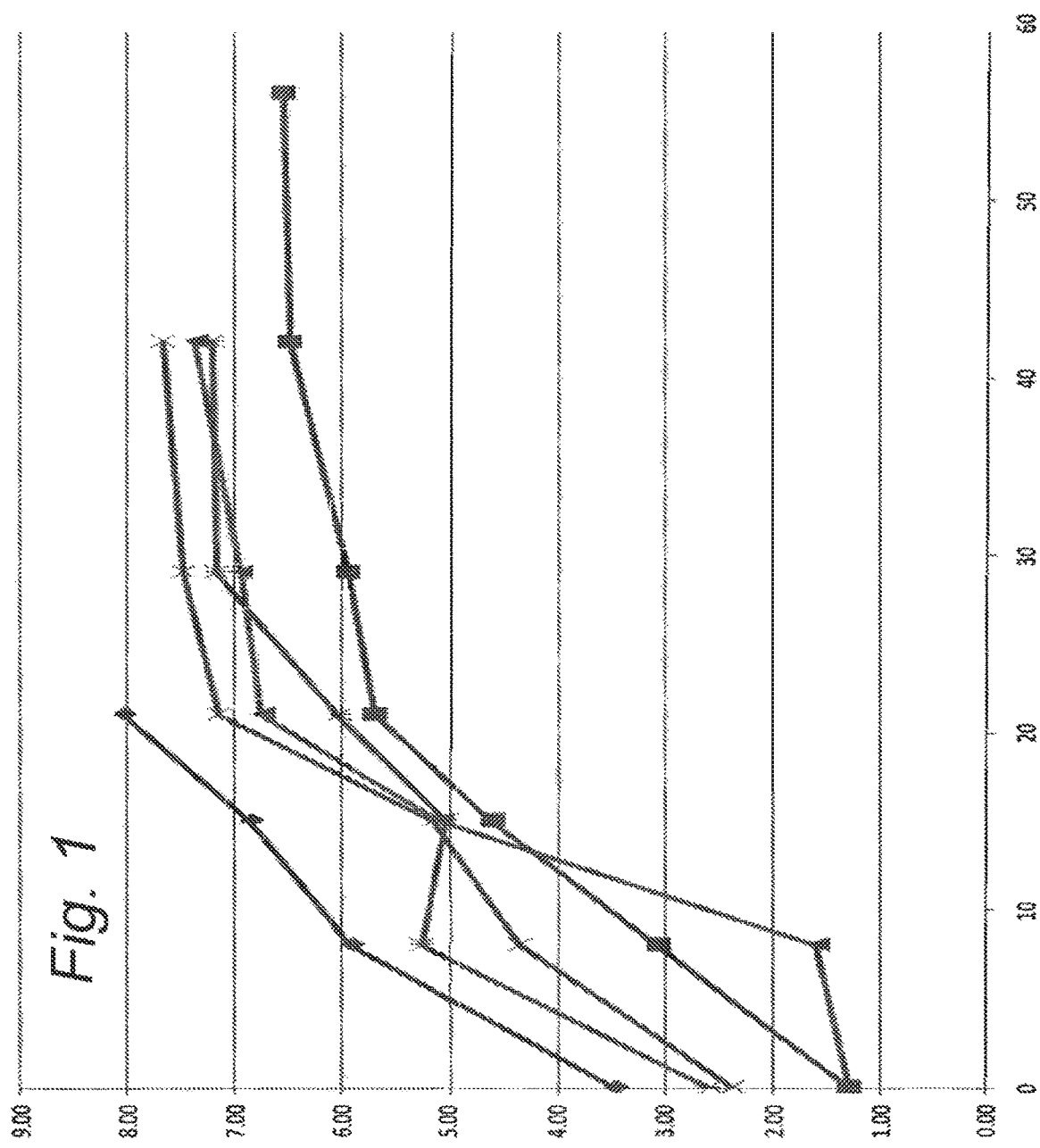
FIG. 1 shows the Aerobic plate counts (APC) (log CFU/cm$^2$) as a function of time (days) for the different preservative solutions as well as for the control.

A first aspect of this invention provides a preservative composition comprising (i) carvacrol and (ii) a cationic surfactant, said cationic surfactant being the condensate of a fatty acid and an arginate ester.

As used herein, the term 'carvacrol' refers to the compound 5-isopropyl-2-methylphenol. It is known to inhibit the growth of several bacterial strains and it has been used as a food additive. It has received GRAS status.

Carvacrol is present in the essential oil of various plants, including oregano, thyme, pepperwort and wild bergamot. Carvacrol containing extracts that are suitable for use in accordance with the present invention are available commercially.

The cationic surfactants of the present invention constitute to a particular, generally known, class of substances derived from the condensation of a fatty acid with an esterified arginate moiety. The best known representative of this class of cationic preservatives are the lauric arginate esters, in particular N-α-lauroyl-L-arginine ethyl ester monohydrochloride. Structurally related substances have also often been described and proposed as preservative.

In a particularly preferred embodiment of the invention, the cationic surfactant has the formula:

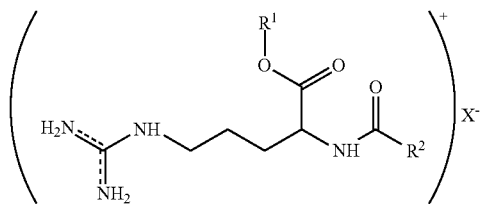

wherein $R^1$ is a linear or branched alkyl radical having from 1 to 12 carbon atoms or is an aromatic radical;
$R^2$ represents a fatty acid tail having from 6 to 20 carbon atoms; and
$X^-$ represents an anion derived from organic or inorganic acids selected from the group consisting of hydrochloric acid, hydrobromic acid, sulfuric acid, citric acid, lactic acid, acetic acid, fumaric acid, maleic acid, gluconic acid, propionic acid, sorbic acid, benzoic acid, carbonic acid, glutamic acid or other amino acids, lauric acid, oleic acid and linoleic acid, phosphoric acid, nitric acid and thiocyanic acid; or an anion derived from a phenolic compound selected from the group consisting of butylated hydroxyanisole, butylated hydroxytoluene, tertiary butyl hydroquinone, methylparaben, ethylparaben, propylparaben and butylparaben.

In a preferred embodiment of the invention $R^1$ is a linear or branched alkyl radical having from 1 to 12 carbon atoms, preferably from 1 to 10 carbon atoms, more preferably from 1 to 8 carbon atoms, most preferably from 1 to 6 carbon atoms. In a particularly preferred embodiment of the invention $R^1$ is selected from the group consisting of methyl, ethyl, propyl, isopropyl, butyl, isobutyl and tert-butyl, preferably from methyl, ethyl and propyl, most preferably it is ethyl.

$R^2$ in the above formula represents the saturated or unsaturated tail of a fatty acid. As will be understood by those skilled in the art, this terminology indicates that the group —C(=O)—$R^2$ in the above structure can be considered to represent the residue of a fatty acid obtained by linkage to the α-amino group of the amino acid via an amide bond. In a preferred embodiment of the invention said fatty acid is a linear alkyl chain of a saturated fatty acid or hydroxy acid having from 6 to 18 carbon atoms, more preferably a saturated fatty acid having from 8 to 16 carbon atoms, most preferably from 10 to 14 carbon atoms. In a particularly preferred embodiment of the invention said fatty acid is selected from the group consisting of stearic acid, palmitic acid, myristic acid, lauric acid, and capric acid, more preferably from myristic acid, lauric acid, and capric acid, most preferably it is lauric acid.

In another preferred embodiment of the invention —$R^2$ represents a moiety of the chemical formula —$(CH_2)_n$—$CH_3$ wherein n represents a number, preferably an even number within the range of 4-18, preferably 4-16, more preferably 6-14, most preferably 8-12, in particular n=8, 10 or 12.

In a preferred embodiment of the invention X⁻ represents an anion derived from organic or inorganic acids selected from the group consisting of hydrochloric acid, hydrobromic acid, sulfuric acid, citric acid, lactic acid, acetic acid, fumaric acid, maleic acid, gluconic acid, propionic acid, lauric acid, oleic acid and linoleic acid. In a particularly preferred embodiment, it is selected from the group consisting of hydrochloric acid, citric acid, lactic acid, acetic acid, propionic acid and lauric acid, most preferably from hydrochloric acid, lactic acid and lauric acid.

In a more preferred embodiment of the invention, the cationic surfactant has the formula:

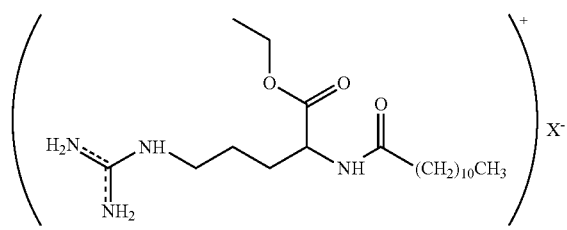

wherein X⁻ represents an anion derived from organic or inorganic acids selected from the group consisting of hydrochloric acid, hydrobromic acid, sulfuric acid, citric acid, lactic acid, acetic acid, fumaric acid, maleic acid, gluconic acid, propionic acid, lauric acid, oleic acid and linoleic acid, preferably from the group consisting of hydrochloric acid, citric acid, lactic acid, acetic acid, propionic acid and lauric acid, most preferably from hydrochloric acid, lactic acid and lauric acid.

In a most preferred embodiment of the invention, the fatty acid arginate ester condensate is N-α-lauryl-L-arginine ethyl ester monohydrochloride (also known as Minerat(R)-N and lauramide arginine ethyl ester, i.e. LAE). This particular lauric arginate ester received GRAS status from the FDA.

The fatty acid arginate ester condensate can be synthesized by processes well-known to those of average skill in the art. For example, LAE may be synthesised from lauric acid, ethanol and L-arginine. LAE is commercially available in a range of products that are suitable for direct application in accordance with the present invention.

In one preferred embodiment, the preservative composition is characterized by a weight ratio of (i) carvacrol to (ii) the fatty acid arginate ester condensate within the range of 0.5-10.0, more preferably 1.0-7.5, more preferably 1.5-6.0, most preferably 2.0-5.0, e.g. around 2.5.

In one preferred embodiment of the invention, the combination of (i) carvacrol and (ii) the cationic surfactant of the invention constitutes at least 2.5 wt. % of the preservative composition of this invention, more preferably at least 5 wt. %, at least 7.5 wt. %, at least 10 wt. %, at least 15 wt. %, at least 20 wt. %, at least 25 wt. %, at least 30 wt. % or at least 35 wt. % of the preservative composition, based on the total weight thereof. The preservative composition may comprise up to 100% of the combination.

In a particularly preferred embodiment of the invention, the preservative combination also comprises (iii) an organic acid component, selected from the group consisting of $C_2$-$C_8$ monocarboxylic acids, lactic acid, citric acid and salts thereof, most preferably acetic acid, lactic acid, propionic acid and salts thereof. In one preferred embodiment of the invention, the preservative combination comprises an acetate component selected from acetic acid, salts thereof and mixtures thereof, preferably in the form of a non-neutralized, partly neutralized or completely neutralized vinegar. In another preferred embodiment the preservative combination comprises a lactate component selected from lactic acid, salts thereof and mixtures, preferably from lactic acid, sodium lactate, calcium lactate, potassium lactate and mixtures thereof, preferably in the form of a fermentation product, such as a non-neutralized, partly neutralized or completely neutralized lactic acid ferment. In another preferred embodiment the preservative combination comprises a propionate component, selected from propionic acid, salts thereof and mixtures thereof, preferably selected from the group consisting of propionic acid, sodium propionate, calcium propionate, potassium propionate and mixtures thereof, preferably in the form of a fermentation product, such as a non-neutralized, partly neutralized or completely neutralized propionic acid ferment.

The term vinegar is used to denote the liquid obtained by the acetous fermentation of an alcoholic liquid, containing at least 4 grams of acetic acid per 100 ml, in particular a vinegar that can be declared 'natural', e.g. in terms of the FDA guidelines. According to said guidelines "natural" means minimally processed and containing no synthetic ingredients or processing aids (cf. Food Labeling: Nutrient Content Claims General Principles, Petitions, Definitions of Terms, 56 Fed. Reg. at 60,466). In a preferred embodiment the preservative composition comprises a non-neutralized, partly neutralized or completely neutralized vinegar selected from the group consisting of white vinegar, brandy vinegar, alcoholic vinegar, balsamic vinegar, wine vinegar, malt vinegar, beer vinegar, potato vinegar, rice vinegar, apple vinegar, cherry vinegar, and cane vinegar. In a particularly preferred embodiment of the invention, the vinegar is cane vinegar. In a preferred embodiment of the invention, the acetic acid content of the vinegar is at least 5% (w/w), more preferably at least 7.5% (w/w), even more preferably at least 10% (w/w). It is also possible to make use of vinegar that has been pre-concentrated to a certain extent. Such products are commercially available and typically have an acetic acid content between 20 and 30% (w/w). In a preferred embodiment of the invention, the acetic acid content of the vinegar is at least 20% (w/w), more preferably at least 25% (w/w), e.g. about 29 or 30% (w/w). A common measure for indicating the acetic acid content of vinegar is the grain strength. The grain strength is the acetic acid content expressed in g/l, so 50 grain vinegar is about 5% (w/w) acetic acid. As will be appreciated by those skilled in the art, it is preferred that the vinegar is at least 200 grain, more preferably at least 250 grain. Often, commercial food-grade vinegars are offered at 200 grain and 300 grain. In one preferred embodiment of the invention, a 300 grain vinegar is used.

Fermentation products, in accordance with the invention, typically are crude or partially purified/clarified ferments. Such fermentation products have favorable organoleptic profiles, which contribute positively to the taste and flavour characteristics of food products to which they are added. Moreover, such fermentation products will provide additional benefits with regard to labeling and regulatory aspects. Fermentation products, in accordance with the invention are obtainable by fermentation of a fermentable substrate with a suitable microorganism, in this case a lactic acid and/or propionic acid producing microorganism, resulting in a composition typically comprising, besides the lactic acid or propionic acid component, traces of the fermentable substrate, other substances produced by the microorganism, and traces of the microorganism itself, e.g. cellular debris and/or cellular components. The lactic acid and/or propionic acid producing micro-organisms may also produce other preservative compounds such as nisin or other bacteriocins, acetic acid, succinic acid, etc. As such, a liquid fermentation product is distinguishable from e.g. highly purified products. The term however does not exclude products which have been subjected to some form of purification/clarification and/or concentration.

In one embodiment, the fermentation product is the supernatant obtainable by fermentation of a fermentable substrate with a lactic acid or propionic acid producing microorganism followed by separating supernatant from (wet) biomass and other solid particles.

In one embodiment of the invention, the fermentation product is a concentrated supernatant obtainable by fermentation of a fermentable substrate with a lactic acid or propionic acid producing microorganism followed by separating supernatant from (wet) biomass and other solid particles and concentrating the supernatant.

In one embodiment of the invention the fermentation product is a partially purified and optionally concentrated supernatant obtainable by fermentation of a fermentable substrate with a lactic acid or propionic acid producing microorganism followed by separation of supernatant from (wet) biomass and other solid particles, purification of the supernatant and, optionally, concentration of the supernatant, with the proviso that the purification does not result in a level of the lactate component or propionate component of more than 97 wt. % on a dry solids weight basis, preferably it does not result in a level of the lactate component or propionate component of more than 96 wt. % on a dry solids weight basis, most preferably it does not result in a level of the lactate component or propionate component of more than 95 wt. % on a dry solids weight basis.

As will be clear to those skilled in the art, the fermentation product comprises other dispersed or dissolved solids besides the lactate or propionate component. Typical examples of such other dispersed or dissolved solids include sugars, such as lactose, glucose and sucrose; other organic acids and/or salts thereof, such as citric acid, pyruvic acid, malic acid, succinic acid, formic acid and acetic acid; nitrogen containing substances, such as amino acids, peptides and proteins; nucleic acid components such as DNA and RNA fragments, nucleotides and nucleosides; cell membrane phospholipids; vitamins; trace elements; and pigments. In a preferred embodiment of the invention, the liquid fermentation product comprises at least one, at least two, at least three, at least four or at least five components selected from the group consisting of lactose, glucose, sucrose, citric acid and salts thereof, pyruvic acid and salts thereof, malic acid and salts thereof, succinic acid and salts thereof, formic acid and salts thereof, acetic acid and salts thereof, amino acids, peptides and proteins. In a preferred embodiment of the invention the liquid fermentation product comprises at least 0.5 wt. % on a dry solids weight basis, preferably at least 1 wt. %, more preferably at least 2 wt. % of one or more components selected from the group consisting of lactose, glucose, sucrose, citric acid and salts thereof, pyruvic acid and salts thereof, malic acid and salts thereof, succinic acid and salts thereof, formic acid and salts thereof, acetic acid and salts thereof, amino acids, peptides and proteins.

The organic acid component (iii) may typically be present in the preservative compositions in amounts within the range of 5.-90 wt. %, preferably within the range of 15-70. wt. %, most preferably within the range of 25-60. wt. %.

In certain embodiments of the invention the preservative composition further comprises a carrier system, comprising one or more solid or liquid carrier materials and optionally one or more additives.

In a particularly preferred embodiment of the invention, a liquid preservative composition is provided comprising a solution or dispersion of the above defined components in a liquid carrier system. In one preferred embodiment, the liquid preservative composition comprises carvacrol in an amount of 0.5-35 wt. %, 1-30 wt. %, 2-25 wt. %, 3-20 wt %, 4-17 wt. %, 5-15 wt. %, 6-14%, 7-13% or 8-12 wt. %, based on the total weight of the liquid preservative composition. In one preferred embodiment, the preservative composition comprises the cationic surfactant in an amount of 0.1-35 wt. %, 0.3-30 wt. %, 0.5-25 wt. %, 0.7-20 wt %, 0.9-17 wt. %, 1.1-15 wt. %, 1.3-14%, 1.5-13% or 1.7-12 wt. % based on the total weight of the liquid preservative composition. In one preferred embodiment, the preservative composition comprises the organic acid component in an amount of 5-90. wt. %, preferably within the range of 15-70. wt. %, most preferably within the range of 25-60. wt. % wt. % based on the total weight of the liquid preservative composition. Liquid preservative composition according to such specifications would be suitable for direct application, although embodiments are envisaged wherein such compositions are further diluted before applying them.

In a particularly preferred embodiment of the invention a liquid preservative composition is produced by combining the above defined components with water or an aqueous solvent and optional further additives.

In an embodiment of the invention, a liquid preservative composition is produced by combining the preservative combination comprising (i) carvacrol and (ii) a cationic surfactant, with a mixture of water and a food grade organic acid or salt thereof, typically an organic acid component as defined herein before. The ratio of water to organic acid component can e.g. be within the range of 0/1-20/1, more preferably 0.1/1-15/1, most preferably 0.2/1-10/1. In an embodiment of the invention, a liquid preservative composition is produced by combining the preservative combination comprising (i) carvacrol and (ii) a cationic surfactant, with a liquid fermentation product or liquid vinegar as defined herein before.

Certain additives may be added to the liquid preservative composition e.g. in order to enhance the stability thereof.

Aliphatic 1,2-diols, such as 1,2-propylene glycol and 1,2-butylene glycol may be included for enhancing the solubility of one or more of the preservative components in water. Additionally, the use of aliphatic 1,2-diols may increase the dispersing quality of the aqueous solution thereby improving the capability of delivering the preservative component into interfibrillar gaps, cuts, etc, in the muscles and tissues of the meat product. In a particularly preferred embodiment of the invention, the preservative composition comprises 1,2-propylene glycol. 1,2-propylene glycol has the GRAS status and it is used as a humectant (E1520), solvent, and preservative in food products.

A food-grade emulsifier may be included in the liquid preservative composition to enhance dispersibility of the preservative components in the meat product. In a preferred form of this invention, the preservative system comprises a food-grade emulsifier selected from the group consisting of lecithins, mono and diglycerides, diacetyltartaric acid esters of mono- and diglycerides, or sorbitan esters. Preferred food-grade emulsifiers belong to the group of polysorbates, i.e. sorbitan fatty-acid esters. A particularly preferred emulsifier is commercially available under the trade name Tween 80.

In a particularly preferred embodiment, the liquid preservative composition comprises 2-70 wt. % water or aqueous solvent, 2-20 wt. % of the aliphatic 1,2-diol, and 1-15 wt. % of the food-grade emulsifier, more preferably 4-60 wt. % of water or aqueous solvent, 5-15 wt. % aliphatic 1,2-diols, and 3-10 wt. % of the food-grade emulsifier, most preferably 5-50 wt. % of water or aqueous solvent, 7.5-12.5 wt. % aliphatic 1,2-diols, and 5-8 wt. % of the food-grade emulsifier. Preferably said liquid preservative composition comprises 3-50 wt. %, preferably 7-45 wt. %, most preferably 10-40 wt. % of the preservative components of the invention.

In one embodiment of the invention, the preservative composition is in the form of a free flowing powder or granulate, which may comprise one or more other excipients and/or a carrier material. In another preferred embodiment a free flowing powder is provided consisting essentially of the preservative combination. Such a free flowing powder may be obtained by combining the various components in an aqueous dispersion or solution followed by drying, e.g. spray-drying.

In other embodiments, a free flowing powder is provided, comprising carvacrol in an amount of more than 0.5 wt. %, 1 wt. %, 2 wt. %, 3 wt %, 4 wt. %, 5 wt. %, 6%, 7% or 8 wt. %, based on the total weight of the powder composition. In one preferred embodiment, a free flowing powder as described herein is provided, comprising the cationic surfactant in an amount of more than 0.1 wt. %, 0.3 wt. %, 0.5 wt. %, 0.7 wt %, 0.9 wt. %, 1.5 wt. %, 2.0%, 2.5% or 3.0 wt. %, based on the total weight of the powder composition. In one preferred embodiment of the invention, a free flowing powder as described herein before is provided comprising the organic acid component in an amount of 5-90. wt. %, preferably within the range of 15-70 wt. %, most preferably within the range of 25-60 wt. %. Such free flowing powders may be obtained by subjecting a liquid obtained by combining carvacrol, the cationic surfactant and an aqueous solvent comprising a mixture of water and a food-grade organic acid or salt thereof, to a concentration and/or drying treatment, such as evaporation, spray-drying.

An advantage of the present invention resides in the fact that the presence of other preservatives, especially synthetic preservatives such as benzoates and sorbates can be minimized or avoided altogether while achieving the desired level of microbial stability. The preservative composition of the present invention typically contains no or only minor amounts of additional preservative agents, such as, in particular, benzoate and/or sorbate. In a preferred embodiment of the invention the preservative composition contains less than 1 wt % of preservative agents selected from the group consisting of sorbates and benzoates, preferably less than 0.5 wt %, preferably less than 0.1 wt %. In a particularly preferred embodiment of the invention the preservative composition is essentially or completely free from preservative agents selected from the group of benzoates and sorbates.

A second aspect of the invention concerns a method of treating a meat product, said method comprising contacting the meat product with an effective amount of (i) carvacrol and (ii) a cationic surfactant, said cationic surfactant being the condensate of a fatty acid and an arginate ester, as defined herein before, and, optionally, (iii) the organic acid component. In a preferred embodiment a method of treating a meat product is provided, said method comprising contacting the meat product with an effective amount of the preservative composition as described herein before.

As discussed herein this treatment is effective to induce a bactericidal and/or bacteriostatic effect in respect of species of bacteria associated with meat spoilage. As used herein, a 'bactericidal and/or bacteriostatic effect' encompasses killing bacteria slowing or as well as arresting the outgrowth of bacteria in meat products, ultimately resulting in enhanced shelf-life thereof, regardless of the precise mechanism underlying such effects. In a preferred aspect the bactericidal or bacteriostatic effect is in respect of bacteria known to spoil meat products kept under conditions of refrigeration, as defined herein elsewhere.

In a preferred embodiment of the invention the bactericidal or bacteriostatic effect is in respect of pathogenic species of bacteria. In another preferred embodiment of the invention the bactericidal or bacteriostatic effect is in respect of spore-forming species of bacteria. In another preferred embodiment of the bactericidal or bacteriostatic effect is in respect of one or more species of bacteria selected from the group of mesophilic bacteria, psychrotrphic bacteria and psychrophilic bacteria. In another preferred embodiment of the invention the bactericidal or bacteriostatic effect is in respect of aerobic species of bacteria. In another preferred embodiment of the invention, the bactericidal effect is in respect of one or more species of bacteria selected from the group consisting of Enterobacteriaceae, lactic acid bacteria, *Clostridium* spp., *Salmonella* spp., *Listeria* spp., *Bacillus* spp., *Staphylococcus* spp., *E. coli*, *Streptococcus* spp, *Lactobacillus* spp, *Balantidium coli*, *Campylobacter coli*, *Campylobacter jejune*, *Francisella tularensis*, *Sarcocystis*, *Taenia saginata*, *Taenia solium*, *Toxoplasma gondil*, *Trichinella spiralis*, *Yersinia enterocolinea*, *Yersinia pseudotuberculosis*, *Brucella*, *Chlamydia petechia* and *Leptospira*, in particular from *Clostridium botulinum*, *Clostridium perfringens*, *Staphylococcus aureus*, *Listeria monocytogenes* and/or *Bacillus cereus*.

In a particularly preferred embodiment of the invention, the bactericidal or bacteriostatic effect is in respect of at least two, most preferably at least three of the aforementioned species of bacteria.

In another preferred embodiment of the invention, the bactericidal effect is in respect of Enterobacteriaceae and/or lactic acid bacteria As mentioned herein before, the treatment of the present invention at the same time proved to be highly effective in preserving an attractive visual appearance of the meat product, in particular preserving the color of the meat product and/or in preventing discoloration of the meat product.

Hence, in an embodiment, the method of the present invention is performed with the aim of accomplishing one/or more of the following improvements:
i) reducing bacteria counts in a meat product; and/or
ii) protecting a meat product against spoilage by bacteria; and/or
iii) extending the shelf-life of a meat product; and/or
iv) preventing discoloration of a meat product; and/or
v) inhibiting the growth of bacteria in a meat product; and/or
vi) improving the safety of a meat product.

In one embodiment of the invention, the method comprises applying carvacrol and the cationic surfactant of the invention, and other optional components, preferably in the form of the preservative compositions as defined herein, especially a liquid preservative composition, to the surface of the meat product in an effective amount. In some embodiments of the invention, a method as defined herein is provided, wherein following application of the preservative composition to the surface of the meat product, said meat product is subjected to treatment resulting in complete or partial removal of the preservative components from the surface of the meat product. The present inventors have established that such treatment is effective to accomplish one or more of the above objectives.

Under food regulations nowadays applicable the preservative compositions as defined herein, can be applied as a processing aid at a dosage of less than 0.5 wt. %, relative to the meat weight, without having to declare it as an ingredient. Hence, in one embodiment of the invention the method comprises applying a liquid preservative composition as defined herein and optionally further treating the meat product, in a manner resulting in an amount of 0.5-5 g of the liquid preservative composition remaining per kg of meat in the final product. As will be understood by those skilled in the art, said amount of the liquid preservative product remaining in/on the meat can be determined in a straight-forward manner by weighing the meat before and after the treatment. Said amount (in wt. %) is also referred to herein as the 'uptake'.

Embodiments are of course also envisaged where the preservative components are not removed from the meat after surface treatment. In accordance with such embodiments the step of applying the preservative components of this invention is followed by packaging the meat product.

In one embodiment of the invention, the method comprises incorporating carvacrol and the cationic surfactant of the invention, and other optional components, preferably in the form of the preservative compositions as defined herein, in the meat product in an effective amount. In one embodiment, carvacrol and the cationic surfactant of the invention, and other optional components, preferably in the form of the preservative compositions as defined herein, are blended with a ground meat product. In another embodiment of the invention carvacrol and the cationic surfactant of the invention, and other optional components, preferably in the form of the preservative compositions as defined herein, may be incorporated in the meat product by injection. In yet another embodiment of the invention carvacrol and the cationic surfactant of the invention, and other optional components, preferably in the form of the preservative compositions as defined herein, is incorporated in a marinade composition that is applied on the meat product. The preservative components of the invention may thus be used as an ingredient of a meat product.

As used herein, the term 'effective amount' refers to an amount sufficient to achieve one or more of the above described bacteriostatic and/or bactericidal effects in the meat product to which the present preservative composition is added. There are no standard parameters to define any of the above effects. In the context of the present invention, a preservative composition is considered bacteriostatic and/or bactericidal if an effect can be shown in direct comparison with a suitable control, typically an otherwise similar meat product that has not undergone the treatment of the present invention.

In one preferred embodiment, the method comprises using carvacrol in an amount resulting in a level of more than 10 ppm, preferably more than 50 ppm, preferably more than 100 ppm, preferably more than 150 ppm, preferably more than 200 ppm, preferably more than 250 ppm. In one preferred embodiment, the method comprises using carvacrol in an amount resulting in a level of less than 2000 ppm, preferably less than 1500 ppm, preferably less than 1000 ppm, preferably less than 750 ppm, preferably less than 650 ppm, preferably less than 600 ppm.

In one preferred embodiment the method comprises applying the cationic surfactant in an amount resulting in a level of more than 5 ppm, preferably more than 25 ppm, preferably more than 50 ppm, preferably more than 75 ppm, preferably more than 100 ppm, preferably more than 125 ppm, preferably more than 150 ppm. In one preferred embodiment, the method comprises applying the cationic surfactant in an amount resulting in level of less than 1000 ppm, preferably less than 750 ppm, preferably less than 500 ppm, preferably less than 375 ppm. The levels as defined here are based on the application of potassium the cationic surfactant N-α-lauryl-L-arginine ethyl ester monohydrochloride. As will be understood by those skilled in the art, if another cationic surfactant is used, such as the lactic acid or lauric acid addition salt of N-α-lauryl-L-arginine ethyl ester, the levels expressed here in ppm may be adjusted to compensate for any difference in molecular weight so as to arrive exactly at a corresponding mol amount. Although, for the purposes of the invention, such differences are in general insignificant, in accordance with an embodiment, the cationic surfactant is applied at a level equivalent to a N-α-lauryl-L-arginine ethyl ester monohydrochloride level within the above specified ranges.

In one preferred embodiment the method comprises applying the organic acid component, as defined herein before, at a level within the range of 50-4500 ppm, preferably 100-3500 ppm, more preferably 150-3000 ppm.

In one embodiment the method comprises applying less than 250 ppm of preservative agents selected from the group of sorbates and benzoates, preferably less than 200 ppm, more preferably less than 100 ppm, more preferably less than 50 ppm, more preferably less than 10 ppm, more preferably less than 1 ppm and most preferably less than 0.5 ppm. This ensures that no negative taste effects are observed. In a particularly preferred embodiment of the invention the method does not comprise applying preservative agents selected from the group of benzoates and sorbates.

As noted herein before, the present preservative composition is particularly suited, and intended, for application in meat products.

Historically, the term "meat" has typically been used to refer to the muscular flesh of animal species living on land, i.e. to the exclusion of aquatic and avian animal species. The term is often considered to additionally refer to other edible tissues, such as offal, of said animal species. In more recent times, the term 'meat' is more casually used in the sense of animal species in general, i.e. as including also avian and aquatic species. For ease of reference, in the context of this invention, the edible parts of (land) animals, fish, poultry crustaceans and shellfish are all referred to as 'meat'. This means that, for example, the term 'poultry meat' refers to the edible tissue of poultry and, as such, these terms can be interchanged without changing the scope of the invention in any way. The term 'fish meat' similarly refers to (and is interchangeable with) the edible tissue of fish, etc.

Hence, in accordance with the invention, the meat can be obtained from any species generally used in the food industry, including livestock species such as cattle (beef), pigs (porc), sheep/lamb, deer, etc.; avian species such as chicken, turkey, etc.; and aquatic species such as salmon, catfish, trout, flounder, haddock, cod, mackerel, tuna, swordfish, shark, squid, clams, scallops, mussels, oysters, abalone, lobster, shrimp, crabs, crayfish, etc.

In accordance with an embodiment of the invention, the meat product preferably comprises at least 80 wt. % of said fish, crustacean, shellfish, poultry or animal meat, more preferably at least 90 wt. %, more preferably at least 95 wt.

%, more preferably at least 97 wt. %, more preferably at least 98 wt. %, more preferably at least 99 wt. %, most preferably at least 99.5 wt. %. In one embodiment of the invention, the meat product consists substantially or entirely of fish, crustacean, poultry or animal meat.

In the art, a distinction is usually made between processed and non-processed meat products. The term 'processed meat' typically is used to refer to meat products, the preparation of which involves processing steps in addition to merely skinning the carcass, dismembering the carcass and/or boning of the meat. Processed meat and poultry products are a very broad category of many different types of products all defined by having undergone at least one further processing or preparation step such as grinding, adding an ingredient, subjecting to heat-treatment, smoking, fermenting, drying, etc. Such treatment significantly change the appearance, texture and/or taste of the meat. Some processed meat products are ready-to-cook, other processed meat and poultry are ready-to-eat. Processed meat products include, for example, whole hams, whole or partial turkey breasts, fish cakes, fish fillets, smoked fish, surimi, delicatessen-style meat products, such as for example, baked ham, boiled ham, roasted turkey breast, roast beef, corned beef, pastrami, bologna, capicola, mortadella, salami, chicken loaf, chicken roll, turkey loaf, turkey roll, hot dogs, frankfurter, sausage, cooked ham, cooked chicken, cooker turkey, cured ham, cured sausage, etc.

According to a preferred embodiment of the invention, the meat product is a fresh or non-processed meat product, preferably a fresh or non-processed meat product selected from the group consisting of animal carcasses, animal carcass parts, fresh or raw cut meat pieces, raw ground meat, raw ground meat products, etc. According to a preferred embodiment of the invention, the meat product is a fresh processed meat product, typically obtained by mixing finely comminuted, minced or sliced muscle meat, with one or more additional ingredients, such as animal fat, common salt, spices, binders, fillers, etc. Preferably the meat product is a fresh processed meat product selected from the group consisting of sausage, patties, hamburgers, kebab, etc.

In another preferred embodiment of the invention, the meat product is a cooked meat product.

Typically the production of 'cooked meat products' involves heating raw meat or pre-cooked meat, optionally after mixing with one or more additional ingredients, such as animal fat, common salt, spices, binders, fillers, etc., at pasteurization or sterilization temperatures. Preferably, the meat product is a raw-cooked meat product selected from the group consisting of cooked ham, cooked chicken, cooked turkey, etc.

According to the present invention, the meat product preferably possesses a specified range of water activities (Aw) similar to that of fresh meat, typically of above 0.90. In one preferred embodiment of the invention, the meat product has a water activity above 0.92, above 0.94, above 0.95, above 0.96 or above 0.97. Furthermore, fresh and/or raw meat products according to the present invention will typically have a moisture content of at least 30 wt. %, more preferably at least 50 wt. %, more preferably at least 65 wt. %, more preferably at least 80 wt. %. Furthermore, fresh and/or raw meat products according to the present invention will typically have a moisture to protein (M:P) ratio of at least 3, more preferably at least 3.25, more preferably at least 3.5, most preferably at least 3.75.

Meat products according to the present invention will typically have a salt content corresponding to that of fresh meat and, in particular, below the range of pickled (or cured) meat. In a preferred embodiment, the meat product of the invention has a salt content below 3 wt. %, based on total weight of the meat product. In one preferred embodiment of the invention, the meat product has a salt content within the range of 0.001-2.5 wt. %, more preferably 0.01-2.0 wt. %, more preferably 0.1-1.5 wt. %, most preferably 0.2-1.0 wt. %. In one preferred embodiment of the invention, the meat product has a NaCl content within the range of 0.001-2.5 wt. %, more preferably 0.01-2.0 wt. %, more preferably 0.1-1.5 wt. %, most preferably 0.2-1.0 wt. %. In a particularly preferred embodiment of the invention, the fresh and/or raw meat product will not comprise any added NaCl at all.

Meat products according to the present invention will possess a specified range of acidity, especially a pH of above 5. In one preferred embodiment of the invention, the pH is at least 5.25, preferably at least 5.5, preferably at least 5.75, preferably at least 6, preferably at least 6.2, preferably at least 6.4, preferably at least 6.5. In one preferred embodiment of the invention, the pH of the meat product is below 8, preferably below 7.5, preferably below 7. As will be understood by those skilled in the art, the pH values as recited here concern the untreated meat product. As specified herein elsewhere, the method of the invention may involve treatment of the meat product with certain acidic components, which may change the pH value of the meat product to a value outside the ranges specified here.

As discussed herein before, the present method results in a bactericidal or bacteriostatic effect and this is particularly useful for meat products that are kept in a refrigerated (rather than a frozen) state. Hence, in an embodiment, the meat product, following treatment according to the invention, is not brought in a frozen state. In accordance with the present invention, the meat product, following treatment according to the invention, is kept or stored under refrigeration or at ambient temperature. Preferably, the meat product is kept or stored at a temperature of above 0° C., preferably within the range of 0-10° C., more preferably within the range of 3-8° C. In a preferred embodiment of the invention, the meat product is contained within a space kept at a temperature within the range of 0-10° C., preferably within the range of 3-8° C., such as a refrigerator. Also, in a particularly preferred embodiment, the method comprises packaging the meat product, following the treatment with the preservatives of this invention, in a package containing instructions to store the packaged meat product in a refrigerator, preferably at a temperature within the range of 0-10° C., preferably within the range of 3-8° C.

An aspect of the invention is directed to the meat products obtainable by the methods of this invention. The meat products benefit from the treatment with carvacrol and the cationic surfactant of the invention, and other optional components, preferably in the form of the preservative compositions as defined herein, in that it enhances the shelf-life. For instance, a treated fresh meat product, preferably is characterized by having a shelf-life of at least 10 days, preferably at least 20 days, most preferably at least 25 days. As used herein, the shelf-life is defined as the amount of time a product remains acceptable for organoleptic, nutritional, and/or safety purposes, for the consumer or the retailer, after production, when appropriately stored, preferably when stored under refrigeration, preferably at a temperature within the range of 0-10° C., preferably within the range of 3-8° C.

Another aspect of the invention concerns the use of carvacrol and the cationic surfactant of the invention, and other optional components, preferably in the form of the preservative compositions as defined herein, for use as a meat preservative and/or for use in the preservation of meat.

Another aspect of the invention concerns the use of carvacrol and the cationic surfactant of the invention, and other optional components, preferably in the form of the preservative compositions as defined herein, for use as a meat ingredient and/or for use as an ingredient in meat processing.

Another aspect of the invention concerns the use of carvacrol and the cationic surfactant of the invention, and other optional components, preferably in the form of the preservative compositions as defined herein, for use as a meat surface treatment agent and/or for use in surface treatment in meat processing.

In particular, the invention concerns the use of carvacrol and the cationic surfactant of the invention, and other optional components, preferably in the form of the preservative compositions as defined herein, for
i) reducing bacteria counts in a meat product; and/or
ii) protecting a meat product against spoilage by bacteria; and/or
iii) extending the shelf-life of a meat product; and/or
iv) preventing discoloration of a meat product; and/or
v)) inhibiting the growth of bacteria in a meat product; and/or
vi) improving the safety of a meat product.

In a preferred aspect the bacteriostatic and/or bactericidal effects referred to above are in respect of bacteria known to spoil meat products kept under conditions of refrigeration, as defined herein elsewhere. In a particularly preferred embodiment of the invention, the bactericidal or bacteriostatic effect is in respect of at least two, most preferably at least three of the species of bacteria defined herein.

The details and preferred embodiments of these aspects of the invention will be readily understood by those skilled in the art based on the foregoing detailed descriptions of the preservative composition and products containing them.

Thus, the invention has been described by reference to certain embodiments discussed above. It will be recognized that these embodiments are susceptible to various modifications and alternative forms well known to those of skill in the art.

Many modifications in addition to those described above may be made to the structures and techniques described herein without departing from the spirit and scope of the invention. Accordingly, although specific embodiments have been described, these are examples only and are not limiting upon the scope of the invention.

Furthermore, for a proper understanding of this document and in its claims, it is to be understood that the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

All patent and literature references cited in the present specification are hereby incorporated by reference in their entirety.

The following examples are offered for illustrative purposes only, and are not intended to limit the scope of the present invention in any way.

EXAMPLES

Example 1: Surface Treatment of Spare Ribs I

Preparation of a Preservative Solution

A preservative solution was prepared by mixing Carvacrol (Carvacrol commercially available from Sigma Aldrich, Netherlands), LAE (Mirenat, commercially available from Vedeqsa, Spain) and lactic acid (Purac FCC 88 commercially available from Corbion Purac, Netherlands.) as preservatives in a solution of propylene glycol (PG) and Tween 80 (emulsifying agent) in water in the following relative amounts: 10.0 wt. % Carvacrol, 10.5 wt. % PG, 2.7 wt. % LAE, 7.0 wt. % Tween 80 and 41.2% lactic acid.

Treatment of Spare Ribs

Spare ribs were obtained from a local butcher. The spare ribs were defrosted for 1.5 days in a fridge at 0° C. and if necessary additionally defrosted at 10° C. on a sterile table. After defrosting, the spare ribs were cut into pieces with 3 ribs (bones) each and stored in a disinfected bin. Spare ribs were mixed manually using sterile gloves before treatment with the preservative solution in order to spread the bacterial load uniformly over the surface of all ribs. Randomly chosen spare ribs were dipped one by one in the preservative solution and kept submerged for 5 s. The ribs were drained for 3 minutes and then packed in a double vacuum bag which was subsequently vacuumed. Packed spare ribs were subsequently stored in a fridge at 4° C.

Analysis

The uptake of preservative solution by the spare ribs during the dipping treatment was assessed by measuring the weight of 10 ribs before treatment and after treatment and calculating the relative weight increase as compared to the initial weight.

Triplicate samples of treated spare ribs were tested against an untreated control consisting of untreated spare ribs by microbiologic analysis at appropriate intervals of time. Of each sample, 3 areas of 10 $cm^2$ were swabbed and the swab was diluted in 10 ml sterile buffered peptone water. Where appropriate, additional dilutions were also made with the same sterile diluent. A 50 µl portion of the appropriate dilution for each sample was plated onto Tryptone Soya Agar (abbreviated as TSA, Oxoid) for total aerobic plate count (APC), MRS medium (Oxoid) for Lactic acid bacteria (micro aerophilic) and VRBG medium (Oxoid) for Enterobacteriaceae using a spiral plater (Eddyjet type 1.23, IUL Instruments, Barcelona, Spain). Plates were incubated for 48 hrs at 30° C. for TSA and MRS medium or for 48 hrs at 37° C. for VRBG medium. Colonies were counted using an automatic colony counter (Colyte Supercount, Synoptics, Cambridge, UK). Results were expressed as the logarithm of the number of colony forming units (CFU)/$cm^2$.

Results

The uptake of preservative solution by the spare ribs during the dipping treatment was found to be 0.75 wt. %.

The results of the microbiological analysis are presented in Table 1. Compared to the control consisting of untreated spare ribs, the shelf life was increased significantly. This may be (partly) due to an instantaneous (bactericidal) effect.

TABLE 1

| log CFU/cm$^2$ | APC | | Lactic acid bacteria | | Enterobacteriaceae | |
| --- | --- | --- | --- | --- | --- | --- |
| | Control | Preserv. solution | Control | Preserv. solution | Control | Preserv. solution |
| day 0 | 1.74 | 0 | 0.92 | 0.44 | 0.89 | 0 |
| day 18 | 5.94 | −0.41 | 5.76 | 0 | 5.43 | 0 |
| day 22 | 6.91 | 1.83 | 6.01 | 1.34 | 5.56 | 0.28 |
| day 24 | 7.74 | 2.68 | 7.00 | 2.67 | 6.36 | 0.32 |
| day 26 | 8.79 | 2.73 | 8.67 | 2.70 | 7.17 | 1.99 |
| day 29 | — | 4.85 | — | 4.81 | 7.32 | 2.26 |
| day 37 | — | 6.22 | — | 6.12 | — | 5.33 |

Example 2: Surface Treatment of Spare Ribs II

Preparation of a Preservative Solution

A liquid preservative composition was prepared consisting of 10 wt. % of Carvacrol (Carvacrol, commercially available from Sigma Aldrich, NL) 4 wt. % LAE (Mirenat., commercially available from Vedeqsa, Spain.) and 34 wt. % of lactic acid (Purac FCC 88 commercially available from Corbion Purac, Netherlands.), 7% Tween 80 (emulsifying agent) and 10.5% PG in water. The pH was adjusted to pH 3.5 with a 50 wt % KOH solution. This liquid preservative composition is referred to as the 100% dosage. Lower dosages of 75%, 50% and 25% were also prepared by adjusting the ratio of dry blend to water accordingly.

As a reference product, a preservative solution comprising Verdad N9 was used. This is a concentrated vinegar product containing 31 wt. % of acetic acid equivalents and is marketed by Corbion Purac. The reference preservative solution was prepared by mixing 750 g Verdad N9 with water up to a total weight of 1 kg.

Treatment of Spare Ribs

Spare ribs were obtained from a local butcher. The spare ribs were defrosted for 1.5 days in a fridge at 0° C. and if necessary additionally defrosted at 10° C. on a sterile table. After defrosting, the spare ribs were cut into pieces with 3 ribs (bones) each and stored in a disinfected bin. Spare ribs were mixed manually using sterile gloves before treatment with the different preservative solutions in order to spread the bacterial load uniformly over the surface of all ribs. The preservative solutions were prepared as described herein before and were continuously stirred until use in order to prevent sedimentation.

Randomly chosen spare ribs were dipped one by one in the different preservative solutions and kept submerged for 5 s. The ribs were drained for 5 minutes and then packed in a double vacuum bag which was subsequently vacuumed. Packed spare ribs were subsequently stored in a fridge at 4° C.

Analysis

The uptake of preservative solution by the spare ribs during the dipping treatment was assessed by measuring the weight of 10 ribs before treatment and after treatment and calculating the relative weight increase as compared to the initial weight.

Duplicate samples of treated spare ribs were microbiologically analyzed at appropriate time intervals. Each sample was placed manually into a stomacher bag and sterile diluent (8.5% w/w sodium chloride and 0.1% w/v bacteriological peptone) was added in a ratio of 1:1 (meat:diluent) and homogenized for 60 s by hand. Where appropriate, additional dilutions were also made with the same sterile diluent. A 50 µl portion of the appropriate dilution for each sample was plated onto Tryptone Soya Agar (Oxoid) for total aerobic plate count (APC), MRS medium (Oxoid) for Lactic acid bacteria and VRBG medium (Oxoid) for Enterobacteriaceae using a spiral plater (Eddyjet type 1.23, IUL Instruments, Barcelona, Spain). Plates were incubated for 48 hrs at 30° C. for TSA and MRS (micro aerophilic) medium or for 48 hrs at 37° C. for VRBG medium. Colonies were counted using an automatic colony counter (Colyte Supercount, Synoptics, Cambridge, UK).

Effects of the treatment on the color of the spare ribs were analyzed visually at 14 days after the treatment.

Results

In all cases, the uptake of preservative solution by the spare ribs was found to be within the 0.6-0.8 wt. % range.

Figure 2:
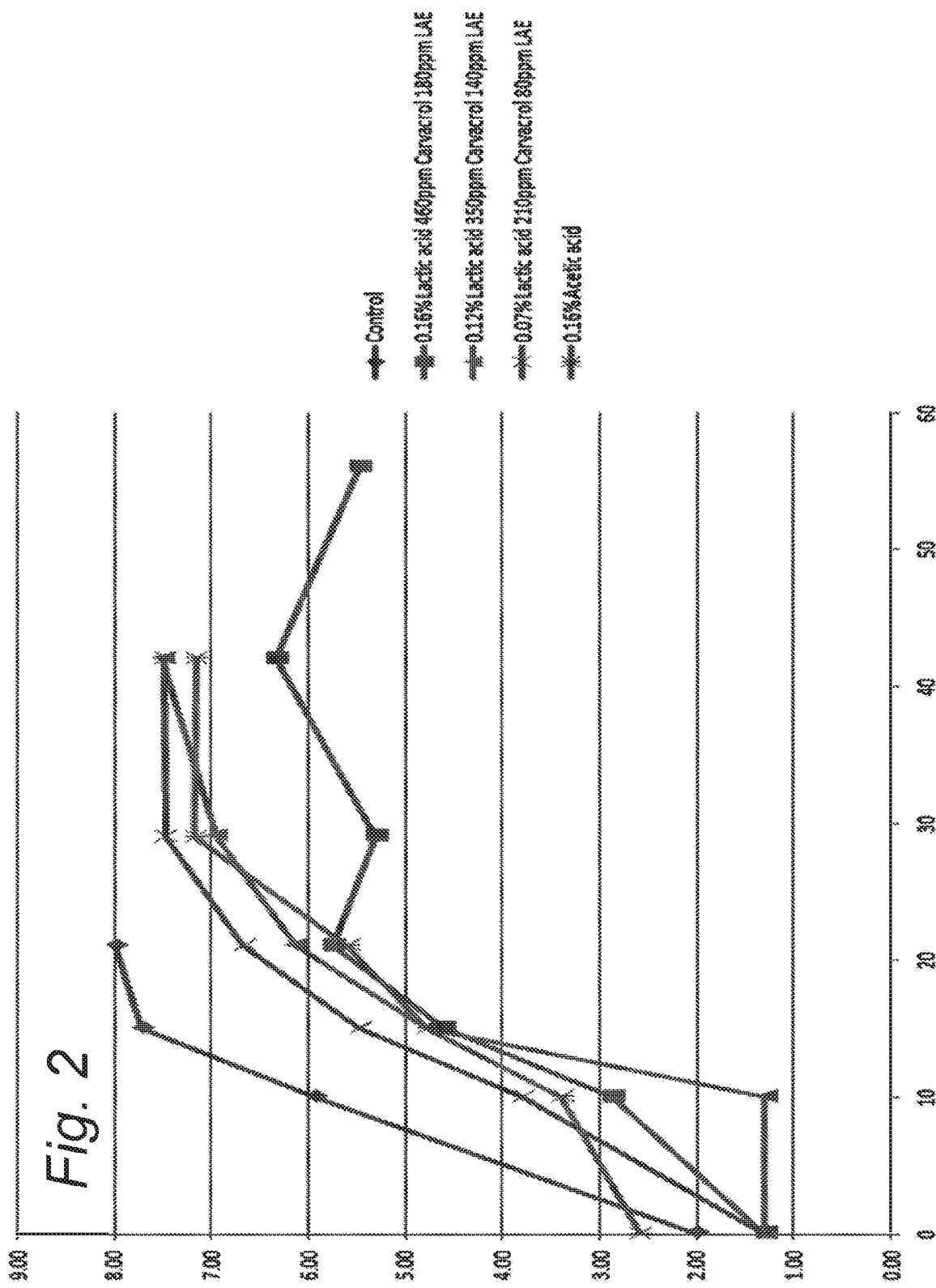
FIG. 2 shows the lactic acid bacteria counts (log CFU/cm$^2$) as a function of time (days) for the different preservative solutions as well as for the control.
Figure 3:
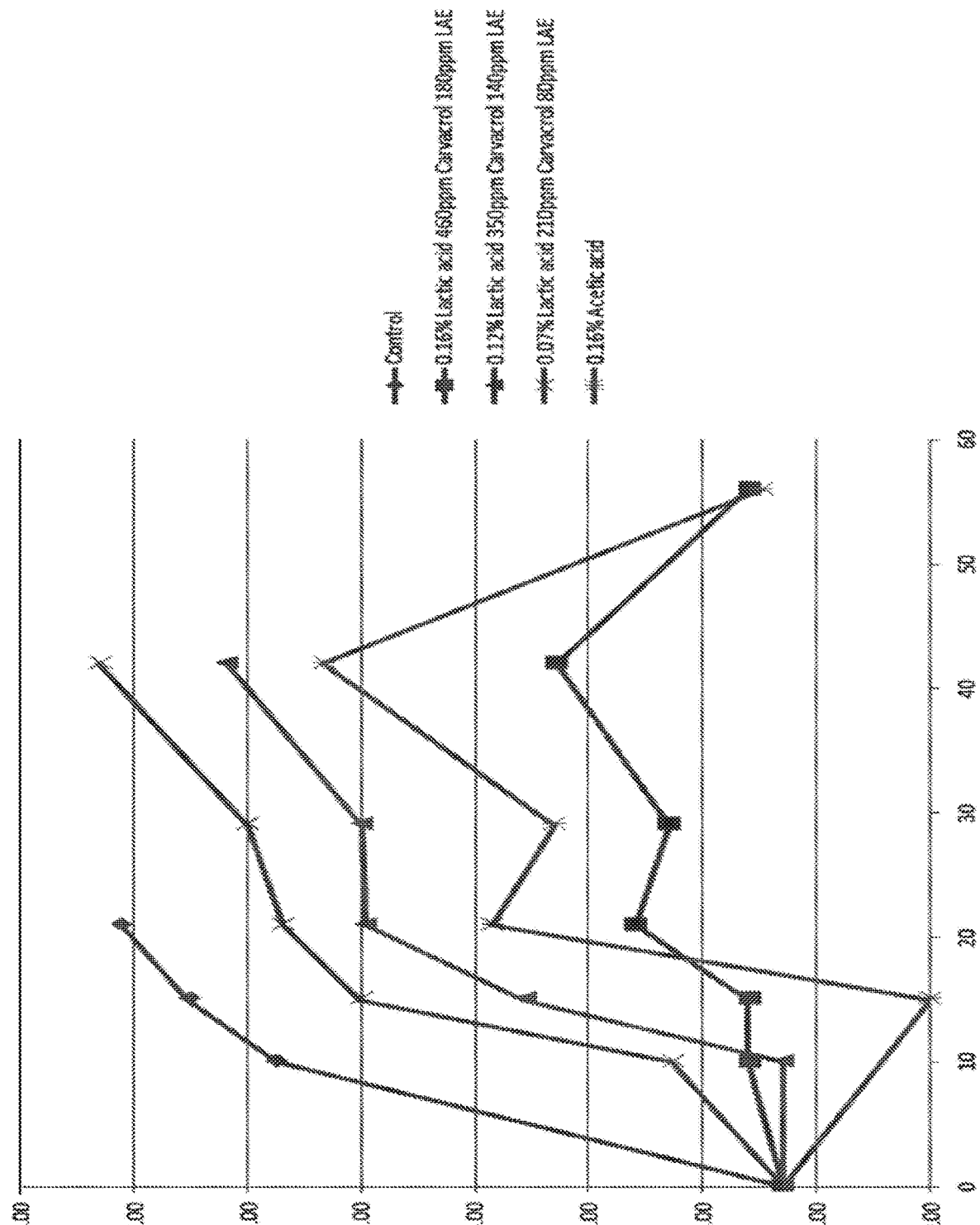
FIG. 3 shows the Enterobacteriaceae (VRBG) counts (log CFU/cm$^2$) as a function of time (days) for the different preservative solutions as well as for the control.

Results of the microbiological analysis are presented in the Figures. FIGS. 1, 2 and 3 show the Aerobic plate counts (APC), the lactic acid bacteria counts and the Enterobacteriaceae (VRBG) counts respectively (log CFU/cm$^2$) as a function of time (days) for the different preservative solutions as well as for the control. Compared to the control consisting of untreated spare ribs, the shelf life of all the treated samples was increased. This may be (partly) due to an instantaneous (bactericidal) effect. With increasing concentration of preservative agents in the preservative solutions, the shelf life increased accordingly. With respect to APC and Lactic acid bacteria, all preservative solutions performed almost equal to or better than reference Verdad N9.

The invention claimed is:

1. A method of preserving a fresh and/or non-processed meat product, the method comprising contacting the meat product with:
    (i) 200-1000 ppm of carvacrol;
    (ii) 50-500 ppm of a cationic surfactant selected from the group consisting of acid addition salts of N-α-lauroyl-L-arginine ethyl ester; and
    (iii) 150-4500 ppm of lactic acid; acetic acid; and/or propionic acid.

2. The method according to claim 1, wherein the cationic surfactant is N-α-lauroyl-L-arginine ethyl ester monohydrochloride.

3. The method according to claim 1, wherein the weight ratio of carvacrol/cationic surfactant is between 0.5/1-10/1.

4. The method according to claim 1, wherein the preservative composition comprises (iii) lactic acid.

5. The method according to claim 1, wherein the preservative composition further comprises a carrier system comprising a mixture of water, an aliphatic 1,2-diol, and a food-grade emulsifier.

6. The method according to claim 1, wherein the meat product comprises fish, crustacean, poultry or animal meat.

7. The method according to claim 1, wherein the meat product is selected from the group consisting of animal carcasses, animal carcass parts, fresh or raw cut meat pieces and raw processed meat products.

8. The method according to claim 1, comprising contacting the preservative composition to the surface of the meat product.

9. The method according to claim 1, wherein the preservative composition is incorporated in the meat product.

10. The method according to claim 1, wherein the method induces a bactericidal and/or bacteriostatic effect on one or more species of bacteria associated with meat spoilage.

11. The method according to claim 10, wherein the species of bacteria is/are selected from the group consisting of Enterobacteriaceae, lactic acid bacteria, *Clostridium* spp., *Salmonella* spp., *Listeria* spp., *Bacillus* spp., *Staphylococcus* spp., *E. coli, Streptococcus* spp, *Lactobacillus* spp, *Balan-*

*tidium coli, Campylobacter coli, Campylobacter jejune, Francisella tularensis, Sarcocystis, Taenia saginata, Taenia solium, Toxoplasma gondil, Trichinella spiralis, Yersinia enterocolinea, Yersinia pseudotuberculosis, Brucella, Chlamydia petechia* and *Leptospira*, in particular from *Clostridium botulinum, Clostridium perfringens, Staphylococcus aureus, Listeria monocytogenes* and/or *Bacillus cereus*.

12. A method of reducing *Salmonella* spp. bacteria counts or inhibiting growth of *Salmonella* spp. bacteria in a fresh and/or non-processed meat product, the method comprising contacting the meat product with:
(i) 200-1000 ppm of carvacrol;
(ii) 50-500 ppm of a cationic surfactant selected from the group of acid addition salts of N-α-lauroyl-L-arginine ethyl ester; and
(iii) 150-4500 ppm of lactic acid; acetic acid; and/or propionic acid.

13. A method of protecting a fresh and/or non-processed meat product against spoilage by *Salmonella* spp. bacteria, the method comprising contacting the meat product with:
(i) 200-1000 ppm of carvacrol;
(ii) 50-500 ppm of a cationic surfactant selected from the group of acid addition salts of N-α-lauroyl-L-arginine ethyl ester; and
(iii) 150-4500 ppm of lactic acid; acetic acid; and/or propionic acid.

14. A method of preserving a fresh and/or non-processed meat product, the method comprising contacting the meat product with a preservative composition comprising:
(i) carvacrol;
(ii) a cationic surfactant selected from the group of acid addition salts of N-α-lauroyl-L-arginine ethyl ester; and
(iii) an organic acid component, selected from lactic acid and salts thereof; an acetate component, selected from acetic acid and salts thereof; and/or a propionate component, selected from propionic acid and salts thereof, wherein the composition is applied to the meat in an amount of:
(a) 200-1000 ppm of carvacrol;
(b) 50-500 ppm of a cationic surfactant selected from the group of acid addition salts of N-α-lauroyl-L-arginine ethyl ester; and
(c) 150-4500 ppm of lactic acid; acetic acid; and/or propionic acid.

15. The method according to claim 14, wherein the organic acid component (iii) is provided in the form of a fermentation product.

16. The method according to claim 14, wherein the composition is applied to the meat in an amount of:
(a) 200-400 ppm of carvacrol;
(b) 125-375 ppm of a cationic surfactant selected from the group of acid addition salts of N-α-lauroyl-L-arginine ethyl ester; and
(c) 150-3000 ppm of lactic acid; acetic acid; and/or propionic acid.

17. The method according to claim 1, wherein the meat product is contacted with:
(a) 200-400 ppm of carvacrol;
(b) 125-375 ppm of a cationic surfactant selected from the group of acid addition salts of N-α-lauroyl-L-arginine ethyl ester; and
(c) 150-3000 ppm of lactic acid; acetic acid; and/or propionic acid.

18. The method according to claim 12, wherein the meat product is contacted with:
(a) 200-400 ppm of carvacrol;
(b) 125-375 ppm of a cationic surfactant selected from the group of acid addition salts of N-α-lauroyl-L-arginine ethyl ester; and
(c) 150-3000 ppm of lactic acid; acetic acid; and/or propionic acid.

* * * * *